(12) United States Patent
Kircher

(10) Patent No.: US 12,444,379 B2
(45) Date of Patent: Oct. 14, 2025

(54) DISPLAY DEVICE, DISPLAY ARRANGEMENT, VEHICLE CABIN AND METHOD FOR MANUFACTURING

(71) Applicant: Airbus Operations GmbH, Hamburg (DE)

(72) Inventor: Benedikt Kircher, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/658,747

(22) Filed: May 8, 2024

(65) Prior Publication Data

US 2024/0379071 A1 Nov. 14, 2024

(30) Foreign Application Priority Data

May 9, 2023 (EP) ..................................... 23172281

(51) Int. Cl.
*G09G 3/34* (2006.01)
*G02F 1/167* (2019.01)
(Continued)

(52) U.S. Cl.
CPC ............. *G09G 3/344* (2013.01); *G02F 1/167* (2013.01); *G02F 1/1676* (2019.01); *G02F 1/1677* (2019.01); *G02F 1/1685* (2019.01); *G06F 3/147* (2013.01); *G09G 2320/066* (2013.01); *G09G 2320/0686* (2013.01); *G09G 2330/12* (2013.01);
(Continued)

(58) Field of Classification Search
CPC ...... G02F 1/167; G02F 1/1676; G02F 1/1677; G02F 1/1685; G06F 3/147; G09G 2300/023; G09G 2320/066; G09G 2320/0686; G09G 2330/12; G09G 2358/00; G09G 2360/141; G09G 2380/02;
(Continued)

(56) References Cited

U.S. PATENT DOCUMENTS 8,730,278 B2 * 5/2014 Yamakita ............... H10K 59/50
  345/107
9,787,948 B2 * 10/2017 de Carvalho .......... H04N 7/183
(Continued)

FOREIGN PATENT DOCUMENTS

CN 106601188 A 4/2017
EP 2460351 B1 9/2019

OTHER PUBLICATIONS

Extended European Search Report for Application No. EP23172281.0, dated Jul. 26, 2023, 15 pages.

*Primary Examiner* — Dmitriy Bolotin
(74) *Attorney, Agent, or Firm* — Nixon & Vanderhye P.C.

(57) ABSTRACT

A display device for a vehicle cabin is disclosed including a first display layer having a plurality of first picture elements and configured to emit light towards a light emission side, a second display layer having a plurality of second picture elements and arranged adjacent to the first display layer opposite to the light emission side, a first control device connected to the first display layer and configured to control the plurality of first picture elements to display a first image on the first display layer, and a second control device connected to the second display layer and configured to control the second picture elements to display a second image on the second display layer. The second display layer is configured as an e-ink layer.

17 Claims, 5 Drawing Sheets

(51) Int. Cl.
*G02F 1/1676* (2019.01)
*G02F 1/1677* (2019.01)
*G02F 1/1685* (2019.01)
*G06F 3/147* (2006.01)

(52) U.S. Cl.
CPC ... *G09G 2360/141* (2013.01); *G09G 2380/02* (2013.01); *G09G 2380/12* (2013.01)

(58) Field of Classification Search
CPC .. G09G 2380/10; G09G 2380/12; G09G 3/32; G09G 3/344
See application file for complete search history.

(56) References Cited

U.S. PATENT DOCUMENTS

| | | | | |
|---|---|---|---|---|
| 10,375,365 B2 * | 8/2019 | Perdices-Gonzalez | | H04N 9/73 |
| 10,453,371 B2 * | 10/2019 | Perdices-Gonzalez | | G09G 3/2092 |
| 10,554,962 B2 * | 2/2020 | Perdices-Gonzalez | | G09G 3/3208 |
| 10,565,925 B2 * | 2/2020 | Perdices-Gonzalez | | G09G 3/348 |
| 2008/0211734 A1 * | 9/2008 | Huitema | | G02F 1/1685 345/3.1 |
| 2009/0034056 A1 * | 2/2009 | Choi | | G02F 1/167 359/296 |
| 2009/0046051 A1 * | 2/2009 | Choi | | G02F 1/167 345/107 |
| 2009/0180078 A1 * | 7/2009 | Whitehead | | G03B 21/14 353/30 |
| 2010/0302614 A1 * | 12/2010 | Peng | | G02F 1/167 359/230 |
| 2011/0043435 A1 * | 2/2011 | Hebenstreit | | G02B 26/005 345/204 |
| 2011/0050545 A1 * | 3/2011 | Namm | | H10K 59/50 345/5 |
| 2012/0105384 A1 * | 5/2012 | Clayton | | G09G 3/3208 345/204 |
| 2013/0050066 A1 * | 2/2013 | Li | | G02F 1/1677 445/24 |
| 2013/0169807 A1 * | 7/2013 | de Carvalho | | H04N 7/183 348/144 |
| 2013/0339992 A1 * | 12/2013 | Oki | | G06Q 30/0241 725/22 |
| 2014/0002365 A1 * | 1/2014 | Ackley | | G06F 3/0219 345/173 |
| 2015/0228217 A1 * | 8/2015 | Perdices-Gonzalez | | G09G 3/3208 345/5 |
| 2015/0234430 A1 * | 8/2015 | Gupta | | H05K 3/30 345/174 |
| 2016/0088726 A1 * | 3/2016 | Jeon | | H05K 1/0281 361/749 |
| 2016/0170281 A1 * | 6/2016 | Lo | | G02F 1/133502 359/296 |
| 2017/0301288 A1 * | 10/2017 | Perdices-Gonzalez | | G09G 3/3208 |
| 2017/0309215 A1 * | 10/2017 | Perdices-Gonzalez | | G09G 3/348 |
| 2017/0310940 A1 * | 10/2017 | Perdices-Gonzalez | | G09G 3/32 |
| 2017/0310956 A1 * | 10/2017 | Perdices-Gonzalez | | G09G 3/2092 |
| 2019/0339582 A1 * | 11/2019 | Lo | | H10K 71/621 |
| 2022/0099874 A1 * | 3/2022 | Qu | | G02F 1/133528 |
| 2023/0254457 A1 * | 8/2023 | Robinson | | G02F 1/134363 349/1 |
| 2024/0349572 A1 * | 10/2024 | Shin | | G02F 1/1677 |

* cited by examiner

DISPLAY DEVICE, DISPLAY ARRANGEMENT, VEHICLE CABIN AND METHOD FOR MANUFACTURING

CROSS RELATED APPLICATION

This application claims priority to European Patent Application EP 23172281.0, filed May 9, 2023, the entire contents of which is hereby incorporated by reference.

FIELD OF THE INVENTION

The present disclosure relates to a display device, a display arrangement, a vehicle cabin and a method for manufacturing a display device for a vehicle cabin.

It is desirable to match displays in aircraft and other vehicles to the architecture and the interior conditions of modules of the vehicle for a better performance. For example, the lighting conditions in a vehicle cabin might be very specific. Further, for a display mounted to a cabin wall, which regularly is curved, the display or screen of the display could desirably also be curved. Moreover, in case of an idle display, a passenger should not be disturbed by a high-contrast black screen that might create a high contrast with the surrounding wall. Furthermore, the ability to display certification-relevant information or items in a high contrast level, fulfilling the DAL level requirements, is desired.

SUMMARY

The present disclosure contemplates having improved displays for a vehicle cabin, in particular, for an aircraft cabin.

According to an exemplary embodiment, this problem is solved in each case by the subject matter of the independent claims.

According to an exemplary embodiment, a display device for a vehicle cabin is provided. The display device comprises a first display layer comprising a plurality of first picture elements and configured to emit light towards a light emission side, a second display layer comprising a plurality of second picture elements and arranged adjacent to the first display layer opposite to the light emission side, a first control device connected to the first display layer and configured to control the plurality of first picture elements to display a first image on the first display layer, and a second control device connected to the second display layer and configured to control the second picture elements to display a second image on the second display layer, wherein the second display layer is configured as an e-ink layer.

According to an exemplary embodiment, a display arrangement for a vehicle cabin comprising a display device according to the invention is provided. The display arrangement further comprises an external light source arranged and configured to illuminate the second display layer for increasing the contrast of the second image.

According to an exemplary embodiment, a vehicle cabin, in particular aircraft cabin, comprising a display device according to the invention is provided, wherein the display device is arranged on a ceiling section of a cabin wall.

According to an exemplary embodiment, a method for manufacturing a display device, in particular a display device according to the invention, is provided. The method comprises providing a substantially transparent first display layer including a plurality of first picture elements and configured to emit light towards a light emission side; attaching a second display layer comprising a plurality of second picture elements to the first display layer opposite of the light emitting side, wherein the second display layer is configured as an e-ink layer; connecting a first control device to the first display layer, wherein the first control device is configured to control the plurality of first picture elements to display a first image on the first display layer; and connecting a second control device to the second display layer, wherein the second control device is configured to control the second picture elements to display a second image on the second display layer.

A fundamental concept of the invention is to provide in the vehicle cabin a low-power paper-like, or e-paper, display layer, which is referred to in the following as an e-ink display layer, or e-ink layer. An e-ink layer behaves similarly to a single-layer print, such as a CMYK printing that can overprint blacks for saturation. The e-ink layer may be configured as a monochrome display or as a color display. Typically, such an e-ink layer is a passive display, but may also be an active layer including at least one integrated light source, such as edge lighting. The e-ink layer is used in addition or in redundancy with a regular display layer. In case of a failure of the regular first display layer, for example, the e-ink layer can still be used to display e.g. certification-relevant items such as a direction of an emergency exit, a non-smoking sign, a seat belt sign, etc.

The first display layer is substantially transparent in an off-state, in which no first image is displayed on the first display layer. In case of failure of the first display, a passenger of the vehicle mainly perceives the second image displayed on the second display. In this way, the e-ink layer can display a predetermined color for reduced contrast with the surrounding wall of the vehicle cabin.

Therefore, a particular advantage of the solution according to an aspect of the invention is that the second display layer, or e-ink layer, can act as a backup in case of failure of the first display layer. In this case, the e-ink layer is able to display certification-relevant items in case it is needed, and further can adapt to the environment such as a wall of a cabin so that it shows an image that has a low contrast between the wall and the display device. In this way, passengers of the vehicle are not disturbed by the failure of the first display layer. Furthermore, an advantage of the display device, in particular the e-ink layer is the low power consumption. The first and second display layers may also be configured to work cooperatively by sharing their common screen. For example, the first display layer displays a video sequence on a first part of the screen while the second display layer displays certification-relevant items on a second part of the screen.

In order to provide redundancy, the first control device and the second control device are configured to control the respective first and second display layer independently. In a normal mode, in which the first display layer is working normally, the second control device turns the e-ink layer black. In case of a failure of the first display, or in case the first display is turned off by the first control device, the second image on the e-ink layer controlled by the second control device is visible due to the transparency of the first display layer.

A vehicle as used in the present invention can be any kind of passenger-carrying transportation means. However, the present invention is directed in particular for the use in an aircraft, i.e. in an aircraft cabin, but not limited thereto. The display device can also be applied to automobiles, busses, trams, train cabins, spacecrafts, etc.

According to an exemplary embodiment, the first display layer is configured as a dynamic color display layer. Furthermore, the first picture elements are configured as light-emitting elements. In this way, fast-moving video sequences and highly saturated color content can be displayed on the display device.

According to an exemplary embodiment, the first display layer is configured as a Light-Emitting Display (LED) layer. Such displays have high contrast, low power consumption and long lifetime. Preferably, the first display layer is configured as an Organic Light-Emitting Display (OLED) layer, which enables even higher contrast.

According to an exemplary embodiment, the first display layer and the second display layer are configured as curved display layers. This enables an adaptation of the display device to curved cabin walls.

According to an exemplary embodiment, the display device further comprises a first power supply configured to power the first display layer and the first control device, and a second power supply configured to power the second display layer and the second control device. The two power devices are used independently to build up a redundancy. In this case, even if the first power supply fails, the display device can display second images on the second display layer by the second control device, which is powered by the second power supply.

According to an exemplary embodiment, the display device further comprises a battery connected to the second control device and the second display layer. In this way, in case of failure of both control devices and/or both power supplies, the battery can still power the second control device and the second display over a specific time period, e.g. several hours.

According to an exemplary embodiment, the display device further comprises a camera directed to at least the first display layer and configured to detect a failure mode of the first display layer and transmit a failure signal to the second control device. The camera can be arranged backwards, i.e. adjacent to the backside, i.e. the opposite side of the light emission side, of the e-ink layer. In this way, a failure can be recognized by the display device itself so that the display device can go into failure mode independently.

According to an exemplary embodiment, the display device further comprises a non-volatile memory including images of certification-relevant items. The second control device is configured to read out the non-volatile memory and output the image of the certification-relevant items to the second display layer. In this way, it is ensured that the display device can display certification-relevant items even in case of failure of the first display layer and/or the first control device.

According to an exemplary embodiment, the external light source comprises a UV-light source, and wherein the second display layer includes a UV-light sensitive element. In this way, a color match with the environment in a failure more can be achieved more easily. For example, a Jana White 12.36 color, which is the typical wall color in aircraft cabins, can be created in a failure mode by illuminating the second display with the UV-light source.

According to an exemplary embodiment, the second display layer includes reflector elements configured to reflect light incident on the second display layer. In this way, a color match with the environment in a failure more can be achieved more easily.

According to an exemplary embodiment, the reflector elements include at least one of glass spheres and retro-reflectors. These optical elements are particularly suitable for increasing the contrast of the second display layer.

According to an exemplary embodiment, the light source is configured to illuminate the second display layer such that, when displayed on the second display layer and illuminated by the external light source, a contrast of the second image is at least 1:1000. This ensures good visibility of the displayed second image on the second display layer, in particular in the case of a failure of the first display layer. In this way, it can be ensured that certification-relevant items can be displayed even in case of multiple failures, e.g. during an emergency.

In the present invention as described above so far, the e-ink layer is mainly intended to be used a backup layer for the first display layer in the display device. However, the display device may also comprise the e-ink layer as the only display layer. In this case, the display device comprises an e-ink layer comprising a plurality of picture elements. In this case, the e-ink layer preferably comprises a reflector element configured to reflect light incident on the e-ink layer. Such a display device also comprises a control circuit configured to control the plurality of picture elements of the e-ink layer.

For such display devices, a display arrangement is provided that comprise a display comprising a display layer, which is configured as an e-ink layer, and comprising a plurality of picture elements. A control circuit configured to control the plurality of picture elements of the e-ink layer. Such a display arrangement includes an external light source arranged and configured to illuminate the e-ink layer for increasing the contrast of the image. The e-ink layer may comprise reflector elements, such as a glass spheres and/or retro-reflectors, and/or the e-ink layer may comprise a UV-sensitive element. In the latter case, an external UV-light source is provided to illuminate the e-ink layer. Similarly, a vehicle cabin arrangement, comprising such a display device may be provided, wherein the display device is arranged on a ceiling section of a cabin wall. With such a display device a color such as Jana White 12.36, which is typical for walls of aircraft cabin may be created.

Such a display device also allows displaying white patterns or logos to create welcoming spaces.

The above embodiments and further developments can be combined with each other as desired, if useful. In particular, all features of the display device are transferable to the display arrangement, the vehicle cabin and/or the method for manufacturing the display device, and vice versa. This applies to both embodiments of the display device comprising both first and second display layers, and the display device comprising only the e-ink layer as the only display layer. Further possible embodiments, further developments and implementations of the invention also comprise combinations, not explicitly mentioned, of features of the invention described before or below with respect to the embodiments. In particular, the skilled person will thereby also add individual aspects as improvements or additions to the respective basic form of the present invention.

BRIEF DESCRIPTION OF THE DRAWINGS

The invention will be explained in greater detail with reference to exemplary embodiments depicted in the drawings as appended.

Figure 1:
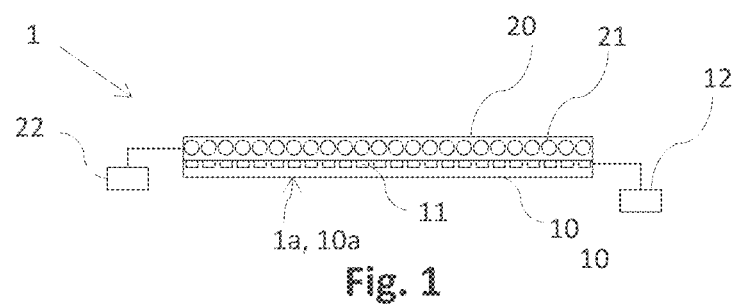
FIG. 1 is a schematic illustration of a display device for a vehicle cabin according to an exemplary embodiment.

The accompanying figures are intended to convey a further understanding of the embodiments of the invention. They illustrate embodiments and are used in conjunction with the description to explain principles and concepts of the invention. Other embodiments and many of the cited advantages emerge in light of the drawings. The elements of the drawings are not necessarily shown to scale in relation to one another. Direction-indicating terminology such as for example "at the top", "at the bottom", "on the left", "on the right", "above", "below", "horizontally", "vertically", "at the front", "at the rear" and similar statements are merely used for explanatory purposes and do not serve to restrict the generality to specific configurations as shown in the figures.

In the figures of the drawing, elements, features and components that are the same, have the same function and have the same effect are each provided with the same reference signs—unless explained otherwise.

DETAILED DESCRIPTION

FIG. 1 shows a schematic illustration of a display device 1 for a vehicle cabin 3 according to an exemplary embodiment.

The display device 1 shown in FIG. 1 comprises a first display layer 10. The first display layer 10 comprises a plurality of first picture elements 11. The first display layer 10 is configured to emit light towards a light emission side 1a, i.e., its outer surface 10a is facing to the light emission side 1a.

A second display layer 20 is arranged adjacent to the first display layer 10 opposite to the light emission side 1a. In this case, the second display layer 20 is arranged directly in contact with the first display layer 10. In further embodiments, an additional layer may be integrated between the first and second display layers 10, 20. The second display layer 20 comprises a plurality of second picture elements 21. The second display layer 20 is configured as an e-ink layer, also referred as e-paper. Typically, such a layer is a passive display layer and is used here in redundancy with the first display layer 10. This e-ink layer behaves similar to a single-layer print, such as a CMYK printing that can overprint blacks for saturation. In further embodiments, the second display layer comprises an internal light source such as an edge lightening to increase the visibility of the second picture elements 21.

The e-ink layer is configured as a color display. The first display layer 10 is configured as a dynamic color display layer and wherein the first picture elements 11 are configured as light-emitting elements. In this embodiment, the first display layer 10 is configured as a Light-Emitting Display (LED) layer, more specifically, as an Organic Light-Emitting Display (OLED) layer. In further embodiments, the e-ink layer is configured as a monochrome display layer.

The display device 1 further comprises a first control device 12, which is connected to the first display layer 10. The first control device 12 is configured to control the plurality of first picture elements 11 in order to display a first image on the first display layer 10. The display device 1 further comprises a second control device 22 connected to the second display layer 20. The second control device 22 is configured to control the second picture elements 21 in order to display a second image on the second display layer 20. The first and second control devices 12, 22 may be formed of any kind of electronics, such as a programmable chip, FPGA, etc. Both control devices 12, 22 are configured to act independently for redundancy so that, if any of the control devices 12, 22 fail, the other is still able to control the respective display layer 10, 20.

Figure 2:
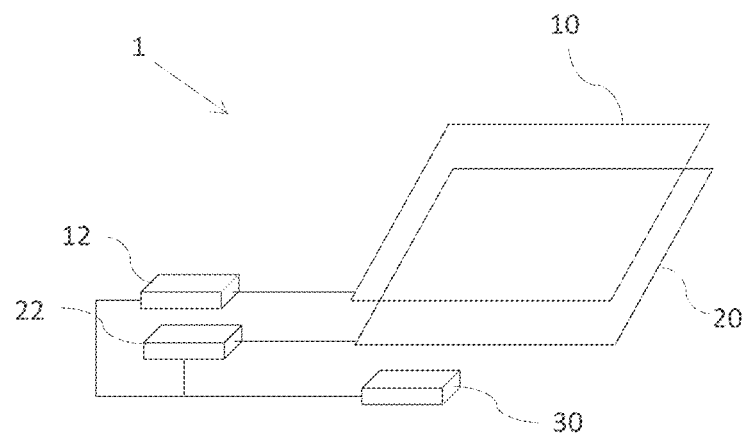
FIG. 2 is schematic illustration of a display device for a vehicle cabin according to an exemplary embodiment.

FIG. 2 shows a schematic illustration of a display device 1 for a vehicle cabin 3 according to a further embodiment of the invention.

The display device 1 shown in FIG. 2 is based on the display device 1 shown in FIG. 1 and further comprises a camera 30. The camera 30 is directed to at least the first display layer 10. The camera 30 is configured to detect a failure mode of the first display layer 10. The camera is able to detect a failure of the first display layer 10, for example, in case the first display 10 does not respond properly to a control signal of the first control device 10 sent to the first display layer 10. In case of detection of a failure of the first display layer 10, the camera transmits a failure signal to the second control device 22.

Figure 3:
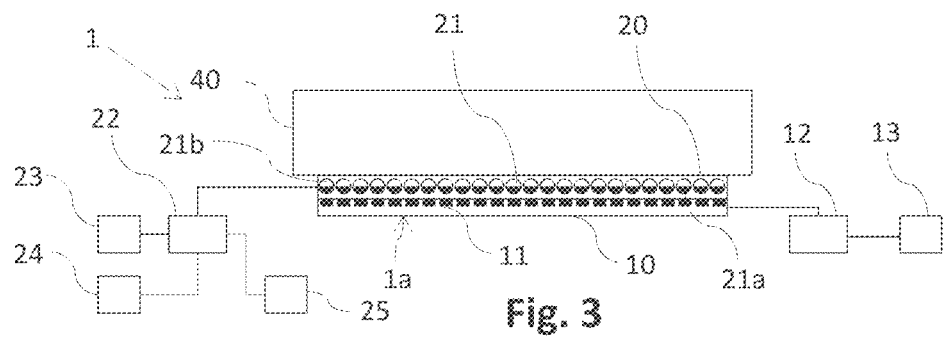
FIG. 3 is a schematic illustration of a display device for a vehicle cabin according to an exemplary embodiment.

FIG. 3 shows a schematic illustration of a display device 1 for a vehicle cabin 3 according to a further embodiment of the invention. The display device 1 shown in FIG. 3 is based on the display device 1 shown in FIG. 1. In addition to the display device 1, a wall section 40 is shown to which the display device 1 is mounted. The wall section 40 can be, for example, a wall of a vehicle cabin 3, such as an aircraft cabin, more specifically a ceiling section 41 of an aircraft cabin 3, as will be described later below.

In this embodiment, the display device 1 further comprises a first power supply 13 and a second power supply 23. The power supplies 13, 23 may be connected to an electric power system of the vehicle. This power system may generate its electric power from a larger rechargeable battery or accumulator, or from fuel, such as kerosene in an aircraft. The first power supply 13 is configured to power the first display layer 10 and the first control device 12. The second power supply 23 is configured to power the second display layer 20 and the second control device 22.

In this embodiment, the display device 1 further comprises a local battery 24 as a further local backup for power supply. The battery 24 is connected to the second control device 22 and the second display layer 20. The battery 24 may be sized large enough to power the second display layer 20 for a longer time period, for example, several hours, which would be about the time frame of a typical flight of an airplane.

In this embodiment, the display device 1 further comprises a non-volatile memory 25 including images of certification-relevant items (not shown in FIG. 3). Certification-relevant items include signs of a direction to an emergency exit, a non-smoking sign, a seat belt sign, etc. The second control device 22 is configured to read out the non-volatile memory 25 and output the image of the certification-relevant items to the second display layer 20.

Although the first and second control devices 12, 22, the first and second power supplies 13, 23, the battery 24 and the non-volatile memory 25 are schematically illustrated separately from the display layers 10, 20 and the wall section 40, these components 12, 13, 22, 23, 24, 25 may be integrated into a common housing (not shown in FIG. 3) or even adjacent to the display layers 10, 20 and/or mounted on or inside the wall section 40.

The display device 1 shown in FIG. 3 is operating in a normal mode, in which the first display layer 10 is displaying dynamically colored first images. In this case, the second display layer 20 is switched to a black mode, so that no disturbing light is emitted or reflected by the second display layer 20. In this case, the second picture elements 21 of the second display layer 20 are configured as glass spheres, which have a black side 21a and a colored side 21b. In the present case, the black side 21a is facing towards the light emission side 1a of the display device 1.

Figure 4:
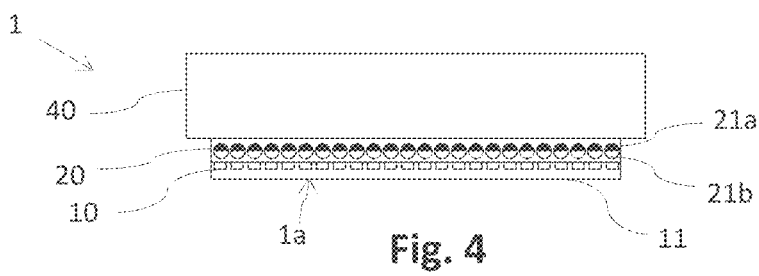
FIG. 4 is a schematic illustration of a display device for a vehicle cabin according to an exemplary embodiment.

FIG. 4 shows a schematic illustration of a display device 1 for a vehicle cabin 3 according to a further embodiment of the invention. The display device 1 shown in FIG. 4 is based on the display device 1 shown in FIG. 3, but the components relating to the control and power supply 13, 23 of the first and second display layers 10, 20 have been omitted for better legibility.

In this case, the display device 1 shown in FIG. 4 is operating in a failure mode, in which the first display layer 10 fails to display first images. In this case, the second display layer 20 is switched to a color mode, so that a second image is displayed in order to mitigate the appearance of the failure of the first display layer 10. In this case, first picture elements 11 are not powered and therefore transparent so that only the second picture elements 21 are visible to a person looking at the display device 1. In this case, the colored side 21b of the second picture elements 21 are facing towards the light emission side 1a of the display device 1, and the black side 21a are facing towards the wall section 40.

Figure 5:
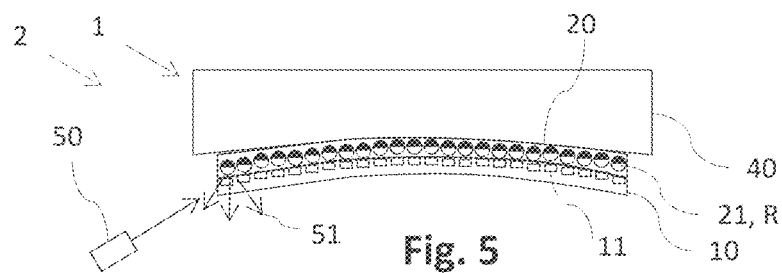
FIG. 5 is a schematic illustration of a display arrangement comprising a display device for a vehicle cabin according to an exemplary embodiment.

FIG. 5 shows a schematic illustration of a display arrangement 2 comprising a display device 1 for a vehicle cabin 3 according to an embodiment of the invention. The display device 1 shown in FIG. 5 is based on the display device 1 shown in FIG. 1 to 4. However, in this embodiment, the first display layer 10 and the second display layer 20 are configured as curved display layers in order to adapt to the wall section 40 to which the display device 1 is mounted to. In particular, an OLED layer as the first display layer 10 is suitable to adapt to a curvature of a wall section 40, which may be a ceiling of an vehicle cabin 3, such as an aircraft cabin.

In the display arrangement 2 shown in FIG. 5, an external light source 50 is arranged and configured to illuminate the display device 1, more specifically the second display layer 20 for increasing the contrast of the second image. Therefore, the second display layer 20 is configured as a completely passive display layer in this embodiment. In order to achieve a certain contrast, the external light source 50 is thus used for illumination.

In the present embodiment, the external light source comprises a UV-light source. Furthermore, the second display layer 20 includes a UV-light sensitive element, which converts the UV-light into a predetermined color spectrum of the visible light. In this way, a desired color, such a Jana White 12.36, which is typical for walls of aircraft cabins, can be created. The second display layer 20 further includes reflector elements R configured to reflect light being incident on the second display layer 20. In this embodiment, the second picture elements are configured as reflector elements in that these are shaped as a glass sphere. In further embodiments, alternative or additional reflector elements R include retro-reflectors, which may be attached behind the second picture elements 21.

In both cases, the light source 50 may be configured to illuminate the second display layer 20 such that, when displayed on the second display layer 20 and illuminated by the external light source 50, a contrast of the second image is at least 1:1000.

Figure 6:
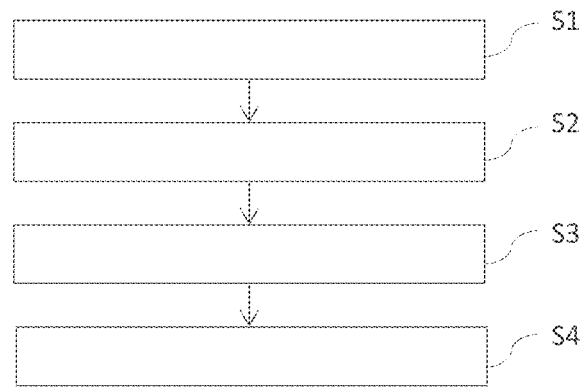
FIG. 6 is a schematic illustration of a method for manufacturing a display device for a vehicle cabin according to an exemplary embodiment.

FIG. 6 shows a schematic illustration of a method for manufacturing a display device 1 for a vehicle cabin 3 according to an embodiment of the invention. The described method for manufacturing a display device 1 for a vehicle cabin 3 is particularly suitable for a display device 1 according to the embodiments as described above. The method comprises the step of providing S1 a substantially transparent first display layer 10 including a plurality of first picture elements 11 and configured to emit light towards a light emission side 1a. A step of attaching S2 a second display layer 20 comprising a plurality of second picture elements 21 to the first display layer 10 opposite of the light emitting side 1a is provided. The second display layer 20 is configured as an e-ink layer. The method further comprises connecting S3 a first control device 12 to the first display layer 10. The first control device 12 is configured to control the plurality of first picture elements 11 to display a first image on the first display layer 10. The method also comprises the step of connecting S3 a second control device 22 to the second display layer 20. The second control device 22 is configured to control the second picture elements 21 to display a second image on the second display layer 20.

Figure 7:
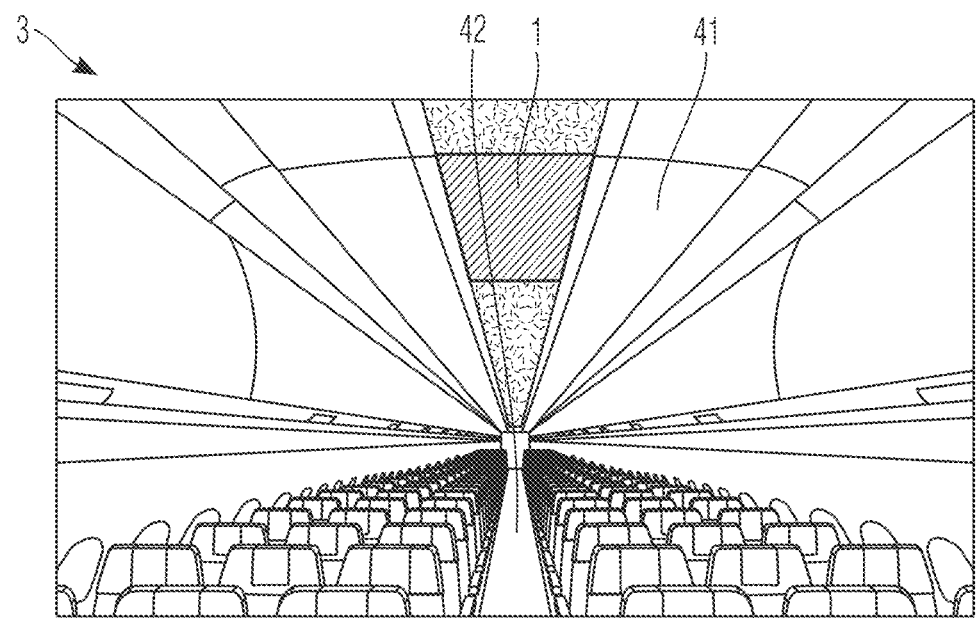
FIG. 7 is a schematic illustration of a vehicle cabin comprising a display device according to an exemplary embodiment.

FIG. 7 shows a schematic illustration of a vehicle cabin 3 comprising a display device 1 according to an embodiment of the invention. In the vehicle cabin 3 shown in FIG. 7, the display device 1 is arranged on a ceiling section 41 of a cabin wall 40, in particular to a central location of the ceiling section above an aisle 42.

The display device 1 appears black, which indicates a failure of the display device 1. This represents the typical case of failure of a display device 1, in which the display turns black. In the present invention, this occurs only in the unlikely event, that both, the first display layer 10 and the second display layer 20 or corresponding control devices 12, 22, as described above, fail at the same time.

Figure 8:
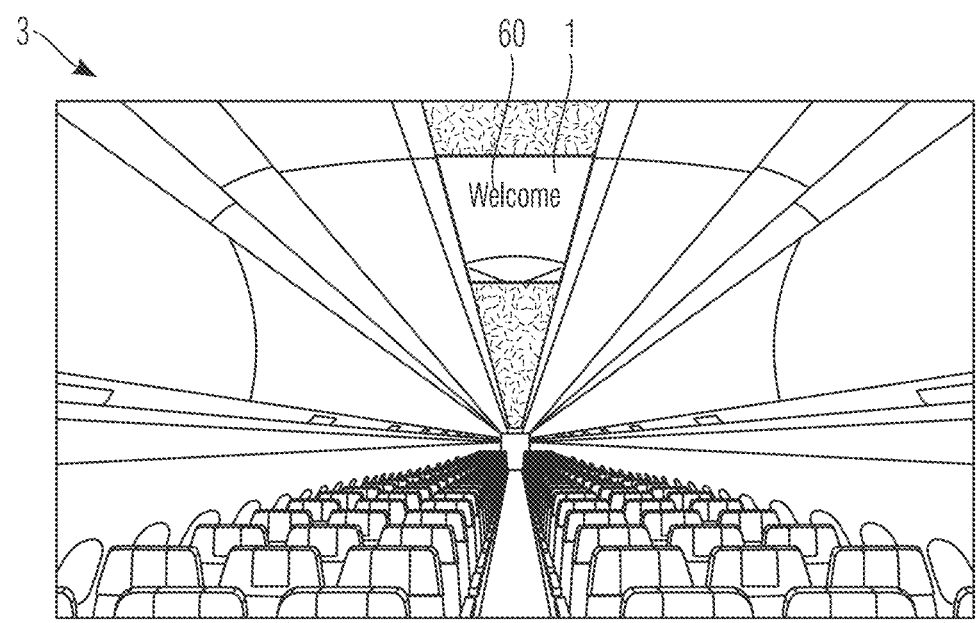
FIG. 8 is a schematic illustration of a vehicle cabin comprising a display device according to an exemplary embodiment.

FIG. 8 shows a schematic illustration of a vehicle cabin 3 comprising a display device 1 according to a further embodiment of the invention. In this case, the display device 1 functions in a normal mode, in which the first display layer 10 is able to display first images, such as a welcome image 60. In the display device 1 of the present invention, the second display layer 20 as well is still able to show colored second images, such as the welcome image 60. For this, the first display layer 10 is powered off so that the picture elements 11 of the first display layer 10 appear transparent.

Figure 9:
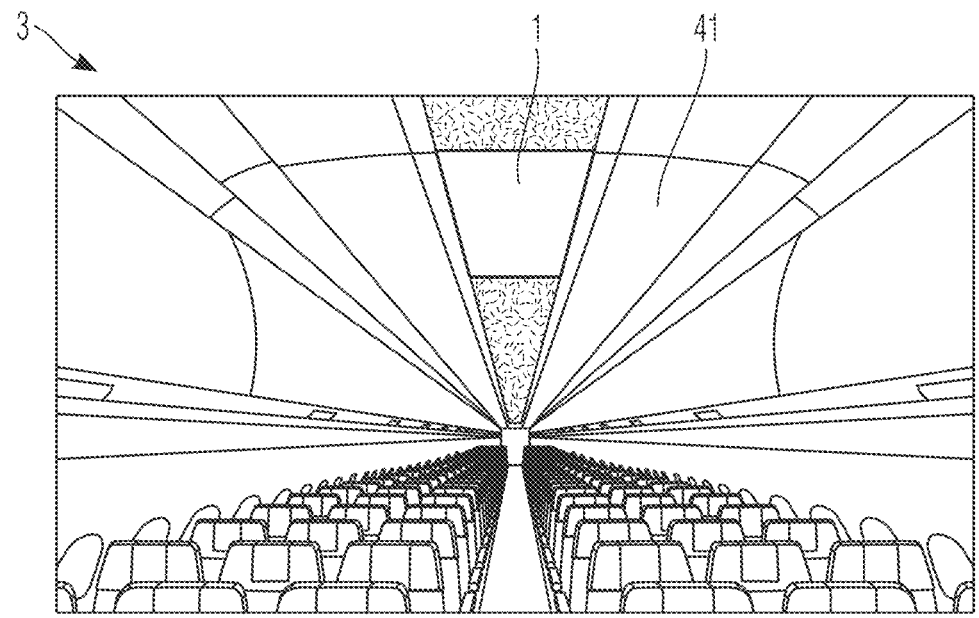
FIG. 9 is a schematic illustration of a vehicle cabin comprising a display device according to an exemplary embodiment.

FIG. 9 shows a schematic illustration of a vehicle cabin 3 comprising a display device 1 according to a further embodiment of the invention.

In FIG. 9, the display device 1 functions in a failure mode, in which the first display layer 10 is turned off and thus turns transparent. The e-ink layer thus displays a bright image in order to reduce the contrast of the display device 1 with the ceiling 41, as compared with FIG. 7.

Figure 10:
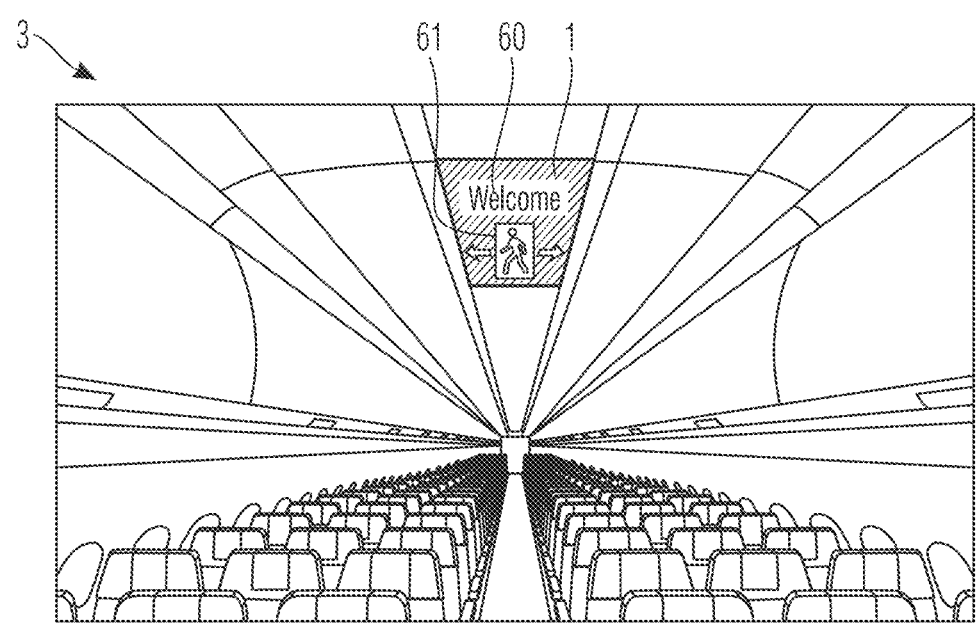
FIG. 10 is a schematic illustration of a vehicle cabin comprising a display device according to an exemplary embodiment.

FIG. 10 shows a schematic illustration of a vehicle cabin 3 comprising a display device 1 according to a further embodiment of the invention. In FIG. 10, the display device 1 displays a welcome image 60 together with an overlayed image of the certification-relevant item 61, in this case, a direction to emergency exits. With the display device 1, the welcome image 60 typically is displayed by the first display layer 10, and the certification-relevant item 61 may be displayed by the second display layer 20, which takes its data from a non-volatile memory 25, as described above with relation to FIG. 3. In further embodiments, both welcome image 60 and certification-relevant item 61 are displayed by the second display layer 20 in order to save energy. In further embodiments, both welcome image 60 and certification-relevant item 61 are displayed by the first display layer 10, and the second display layer 20 is maintained for redundancy.

Figure 11:
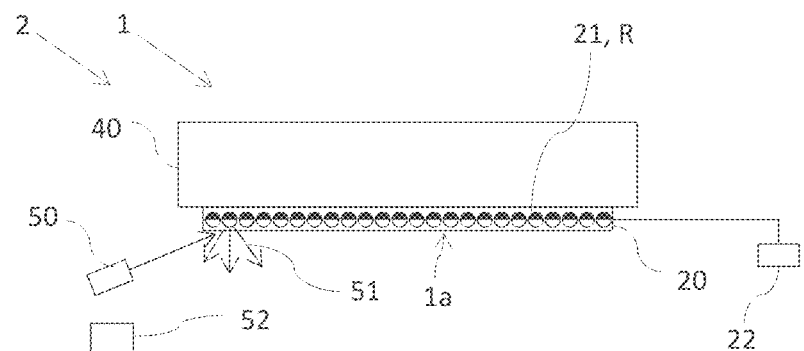
FIG. 11 is a schematic illustration of a display arrangement comprising a display device for a vehicle cabin according to an exemplary embodiment.

FIG. 11 shows a schematic illustration of a display arrangement 2 comprising a display device 1 for a vehicle cabin 3 according to a further embodiment of the invention. In the previous embodiments of the display device 1, i.e., described with reference to FIG. 1 to 10, the e-ink layer is mainly intended to be used for redundancy and/or as a backup layer for the first display layer 10 in the display device 1. However, the display device 1 may also comprise the second display layer 20, i.e. the e-ink layer, as the only display layer. In this case, the display device 1 comprises a display layer, which is configured as an e-ink layer, and comprising a plurality of picture elements 21. In the embodiment shown in FIG. 11, the e-ink layer comprises a reflector element R configured to reflect light incident on the e-ink layer. The reflector element R is integrated into the picture element 21 and configured as a glass sphere. In further embodiments, the reflector element R may be configured as a retro-reflector arranged e.g. behind the picture elements 21 with respect to the light emission side 1a. The display device 1 shown in FIG. 11 also comprises a control circuit 22 configured to control the plurality of picture elements 21 of the second display layer 20.

For the display device 1 of FIG. 11, a display arrangement 2 is provided, which comprises a display device 1 comprising display layer 20, which is configured as an e-ink layer. The e-ink layer comprises a plurality of picture elements 21. The display arrangement 2 includes an external light source 50, 52 arranged and configured to illuminate the e-ink layer for increasing the contrast of the displayed image. In FIG. 11, reflected light is shown as a result of the illumination of the external light source 50 onto the picture elements 21, which are configured as reflector elements R due to their shape as a glass sphere. Besides a reflector element R, the e-ink layer may comprise, in addition or alternatively, a UV-sensitive element. In FIG. 11, an external UV-light source 50 is provided to illuminate the second display layer 20, i.e. the e-ink layer. An additional external light source 52 represents an ambient light source 52, which also illuminates the display device 1 for increased contrast, thus also leading to reflected light 51.

Figure 12:
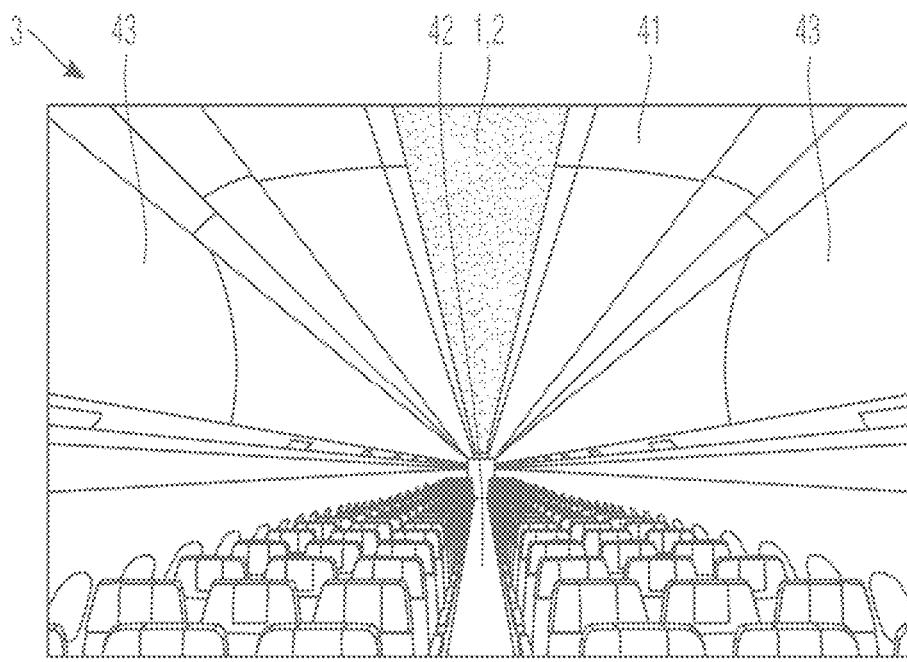
FIG. 12 is a schematic illustration of a vehicle cabin comprising a display device according to an exemplary embodiment.

FIG. 12 shows a schematic illustration of a vehicle cabin 3 comprising a display device 1 according to a further embodiment of the invention. The vehicle cabin 3 shown in FIG. 3 comprises the embodiment of the display device 1 as described above with reference to FIG. 11, wherein the external light sources 50, 52 are not shown. These may be arranged between an overhead department and the ceiling section 51, or at any other suitable place in the vehicle cabin 3. The display device 1 is arranged on a ceiling section of a cabin wall, similar to the embodiments shown before. However, in this case, the display device 1 displays a pattern similar to the ceiling section 41 above the aisle 42, so that the display device 1 is hardly visible for passengers in the vehicle cabin 3. The shown pattern is merely an example of the ability of the display device 1 shown in FIG. 11. The display device 1 of the present embodiment is further able to display the welcome image 60 or certification-relevant items 61 as described above.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and exemplary embodiments. Many other examples will be immediately and directly clear to a person skilled in the art on the basis of his knowledge in the art in consideration of the above description.

The exemplary embodiments have been chosen and described in order to be able to present the principles underlying the invention and their application possibilities in practice in the best possible way. As a result, those skilled in the art can optimally modify and utilize the invention and its various exemplary embodiments with regard to the intended purpose of use. In the claims and the description, the terms "including" and "having" are used as neutral linguistic concepts for the corresponding terms "comprising". Furthermore, use of the terms "a", "an" and "one" shall not in principle exclude the plurality of features and components described in this way. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A display device for a vehicle cabin, comprising:
   a first display layer comprising a plurality of first picture elements and configured to emit light towards a light emission side,
   a second display layer comprising a plurality of second picture elements and arranged adjacent to the first display layer opposite to the light emission side,
   a first control device connected to the first display layer and configured to control the plurality of first picture elements to display a first image on the first display layer,
   a second control device connected to the second display layer and configured to control the second picture elements to display a second image on the second display layer,
   an edge lighting apparatus integrated into the second display layer, and
   wherein the second display layer is configured as an e-ink layer.

2. The display device according to claim 1, wherein the first display layer is configured as a dynamic color display layer, and wherein the first picture elements are configured as light-emitting elements.

3. The display device according to claim 2, wherein the first display layer is configured as a Light-Emitting Display (LED) layer, or an Organic Light-Emitting Display (OLED) layer.

4. The display device according to claim 1, wherein the first display layer and the second display layer are configured as curved display layers.

5. The display device according to claim 1, further comprising a first power supply configured to power the first display layer and the first control device; and
a second power supply configured to power the second display layer and the second control device.

6. The display device according to claim 1, further comprising a battery connected to the second control device and the second display layer.

7. The display device according to claim 1, further comprising a camera directed to at least the first display layer and configured to detect a failure mode of the first display layer and transmit a failure signal to the second control device.

8. The display device according to claim 1, further comprising a non-volatile memory including images of certification-relevant items,
wherein the second control device is configured to read out the non-volatile memory and output the image of the certification-relevant items to the second display layer.

9. A display arrangement for a vehicle cabin, comprising:
the display device according to claim 1, and
an external light source arranged and configured to illuminate the second display layer for increasing the contrast of the second image.

10. The display arrangement according to claim 9, wherein the external light source comprises a UV-light source, and wherein the second display layer includes a UV-light sensitive element.

11. The display arrangement according to claim 9, wherein the second display layer includes reflector elements (R) configured to reflect light incident on the second display layer.

12. The display arrangement according to claim 11, wherein the reflector elements (R) include at least one of glass spheres and retro-reflectors.

13. The display arrangement according to claim 9, wherein the light source is configured to illuminate the second display layer such that, when displayed on the second display layer and illuminated by the external light source, a contrast of the second image is at least 1:1000.

14. A vehicle comprising the display device according to claim 1, wherein the display device is arranged on a ceiling section of a cabin wall.

15. A method for manufacturing the display device according to claim 1, comprising:
providing (S1) a substantially transparent first display layer including a plurality of first picture elements and configured to emit light towards a light emission side (1a);
attaching (S2) a second display layer comprising a plurality of second picture elements to the first display layer opposite of the light emitting side, wherein the second display layer is configured as an e-ink layer;
connecting (S3) a first control device to the first display layer, wherein the first control device is configured to control the plurality of first picture elements to display a first image on the first display layer; and,
connecting (S3) a second control device to the second display layer, wherein the second control device is configured to control the second picture elements to display a second image on the second display layer.

16. A display device for a vehicle cabin, comprising:
a first display layer comprising a plurality of first picture elements and configured to emit light towards a light emission side,
a second display layer comprising a plurality of second picture elements and arranged adjacent to the first display layer opposite to the light emission side,
a first control device connected to the first display layer and configured to control the plurality of first picture elements to display a first image on the first display layer,
a second control device connected to the second display layer and configured to control the second picture elements to display a second image on the second display layer,
an edge lighting apparatus integrated into the second display layer,
wherein the second display layer is configured as an e-ink layer, and
wherein the e-ink layer is an active layer providing internal illumination.

17. A display device for a vehicle cabin, comprising:
a first display layer comprising a plurality of first picture elements and configured to emit light towards a light emission side,
a second display layer comprising a plurality of second picture elements and arranged adjacent to the first display layer opposite to the light emission side,
a first control device connected to the first display layer and configured to control the plurality of first picture elements to display a first image on the first display layer,
a second control device connected to the second display layer and configured to control the second picture elements to display a second image on the second display layer,
wherein the second display layer is configured as an e-ink layer,
a camera directed to at least the first display layer and configured to detect a failure mode of the first display layer and transmit a failure signal to the second control device, and
wherein the camera is arranged adjacent to a backside of the second display layer opposite to the light emission side, such that the camera detects the failure mode through the second display layer.

* * * * *